8559X
W. Emmons,
Horse Power,
Patented Dec. 24, 1834.
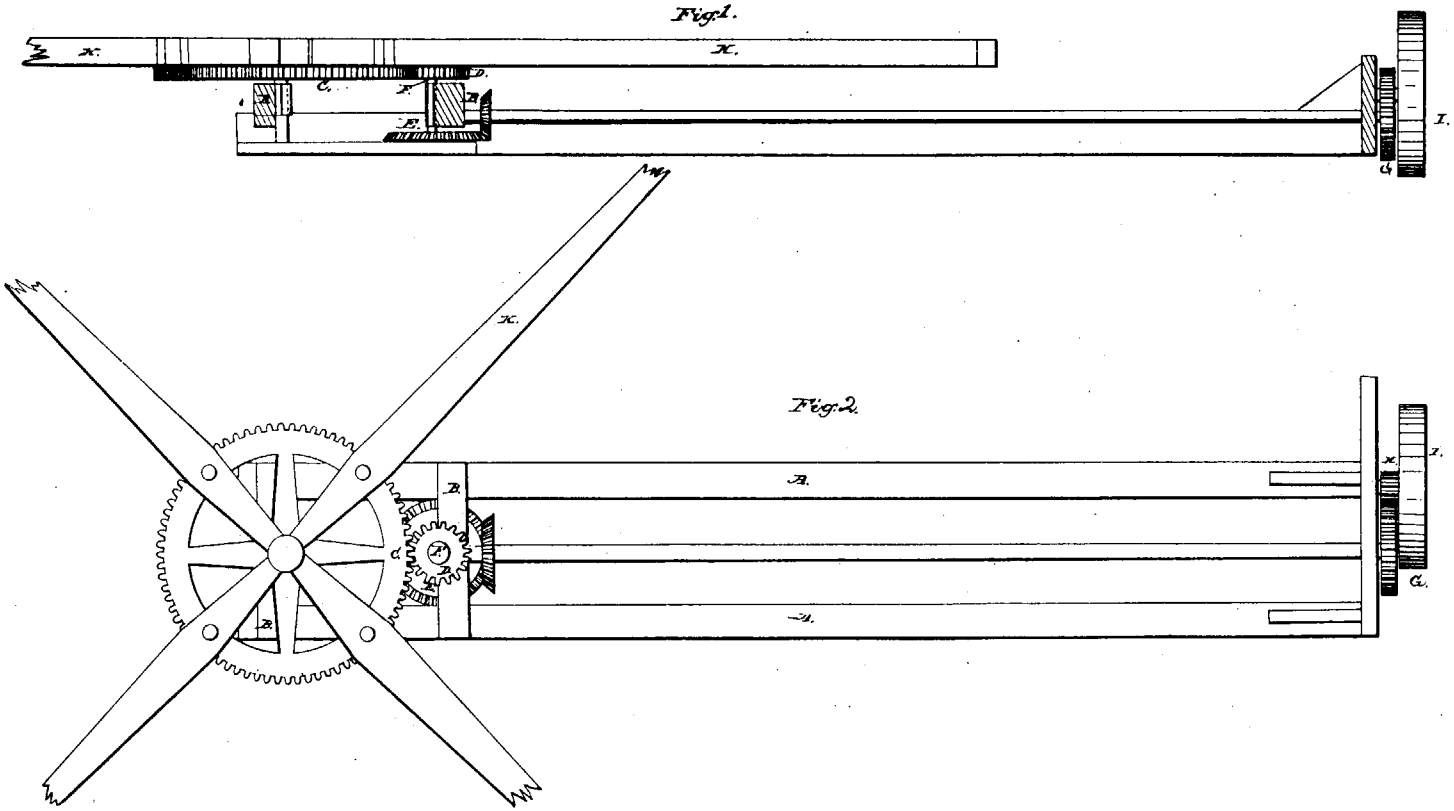
AM. PHOTO-LITHO. CO. N.Y. (OSBORNE'S PROCESS)

William Emmons of New York City 8559X

Letters Patent.

The Schedule referred to in these Letters Patent and making part of the same containing a description in the words of the said William Emmons himself of his improvement in the Horse Power To all to whom these Presents shall come.

Be it known that I William Emmons of the City and County of New York have invented a new and useful improvement in the horse Power and that the following is a full and exact description of the construction and operation of the said Horse Power as invented by me Viz. A frame is constructed by placing two sticks of timber of about thirteen feet, in length parallel with each other and about twenty inches distant apart. two pieces of timber about eight inches deep and five inches thick are notched on and then bolted across the above mentioned thirteen foot pieces. On and across the opposite end of said thirteen foot pieces is placed a piece of plank about four inches thick and one foot wide and supported in an edgewise position by braces. a piece of plank about three feet long is fitted in between said thirteen foot pieces on which is placed the steps to receive two upright shafts. the upper ends of said Shafts being supported by journals and boxes bolted to the top timber of the frame. the first or main shaft is about four inches square and extends a sufficient height above the frame to receive the main or driving Cog wheel which is about thirty inches in diameter. Said Cog Wheel meshes into a pinion of about one fourth of its size on the second upright shaft which is about two and a half inches square. on the lower part of said second Shaft between the top and bottom timbers of the frame is placed a bevel wheel about twenty inches in diameter. Said bevil wheel meshes into a pinion of about one fourth of its diameter on a horizontal iron shaft which is about one and a half inch in diameter. and is secured by journals and boxes in a position parallel with and between the bottom pieces of the frame. on the opposite end of said horizontal Shaft is placed a Spur wheel of about eighteen inches in diameter which meshes onto a pinion of about one third or fourth of the size of said Spur Wheel. said pinion being secured to the central part of the drum which is about two feet in diameter and hung on a pivot or Spindle of sufficient strength projecting from the cross plank of the frame. four levers of about ten feet in length, are secured to the main or driving wheel. they working against projections on the rim of said wheel at right angles with each other. The outer ends being elevated about two and 1/2 feet from the bottom timber of the frame. Braces are placed between said levers to keep them at equal distance apart. The Horses are hitched to the outer end of said levers - and in the circle of their walk, step over the bottom timbers of the frame which are planked over the spur wheel on the horizontal shaft; also the drum being within the circle of the Horses walk. I sometimes place the main cog wheel and pinion below the top timbers of the frame. in which case a suitable flange is placed on the top end of the main shaft, to which the levers are secured. What I claim as my invention and improvement is the proportions and peculiar arrangement of the several parts of the above.

Witnesses
James Flanagan
John T. Dwyer

William Emmons

Drawing.

(660 words)